(12) United States Patent
Kaswen et al.

(10) Patent No.: US 8,656,823 B2
(45) Date of Patent: Feb. 25, 2014

(54) METHODS AND APPARATUS FOR SUSPENDING A VEHICLE SHIELD

(75) Inventors: Robert Kaswen, Watsonville, CA (US); David M. Haugen, Pacific Grove, CA (US)

(73) Assignee: Fox Factory, Inc., Scotts Valley, CA (US)

( * ) Notice: Subject to any disclaimer, the term of this patent is extended or adjusted under 35 U.S.C. 154(b) by 480 days.

(21) Appl. No.: 12/793,755

(22) Filed: Jun. 4, 2010

(65) Prior Publication Data

US 2010/0307329 A1     Dec. 9, 2010

Related U.S. Application Data

(60) Provisional application No. 61/184,644, filed on Jun. 5, 2009.

(51) Int. Cl.
    *F41H 7/04*      (2006.01)

(52) U.S. Cl.
    USPC ............ 89/36.08; 280/784; 296/187.08

(58) Field of Classification Search
    USPC ........... 89/36.01, 36.02, 36.07, 36.08, 36.09; 280/784
    See application file for complete search history.

(56) References Cited

U.S. PATENT DOCUMENTS

| | | | |
|---|---|---|---|
| 3,666,310 A * | 5/1972 | Burgess et al. | 293/109 |
| 3,944,270 A * | 3/1976 | Kreuzer | 293/134 |
| 3,972,551 A | 8/1976 | Fannin | |
| 4,079,924 A * | 3/1978 | Persicke | 267/116 |
| 4,404,889 A | 9/1983 | Miguel | |
| 4,426,109 A * | 1/1984 | Fike, Jr. | 293/133 |
| 4,961,368 A * | 10/1990 | Hartmann | 89/36.02 |
| 5,022,307 A | 6/1991 | Gibbons, Jr. et al. | |
| 5,044,614 A | 9/1991 | Rau | |
| 5,533,781 A * | 7/1996 | Williams | 296/204 |
| 5,542,626 A * | 8/1996 | Beuck et al. | 244/107 |
| 5,553,836 A | 9/1996 | Ericson | |
| 5,663,520 A * | 9/1997 | Ladika et al. | 296/187.07 |
| 5,747,721 A * | 5/1998 | Speakes et al. | 89/36.11 |
| 5,803,443 A | 9/1998 | Chang | |
| 6,135,434 A | 10/2000 | Marking | |
| 6,192,914 B1 | 2/2001 | Farwell | |
| 6,311,962 B1 | 11/2001 | Marking | |
| 6,360,857 B1 | 3/2002 | Fox et al. | |
| 6,477,934 B1 * | 11/2002 | Bruhn et al. | 296/193.07 |
| 6,523,450 B1 * | 2/2003 | Schreiber | 89/36.11 |
| 7,114,764 B1 * | 10/2006 | Barsoum et al. | 296/193.07 |
| 7,140,601 B2 | 11/2006 | Nesbitt et al. | |
| 7,228,927 B2 * | 6/2007 | Hass et al. | 180/65.25 |
| 7,293,764 B2 | 11/2007 | Fang | |
| 7,618,082 B2 | 11/2009 | Tamada | |
| 7,836,810 B2 * | 11/2010 | Meyer | 89/36.17 |
| 7,856,762 B2 * | 12/2010 | Deisenroth et al. | 52/79.1 |
| 7,891,151 B2 * | 2/2011 | Sano | 52/506.05 |
| 7,908,959 B2 * | 3/2011 | Pavon | 89/36.17 |
| 7,954,419 B2 * | 6/2011 | Ran et al. | 89/36.08 |
| 7,997,182 B1 * | 8/2011 | Cox | 89/36.09 |
| 8,025,005 B2 * | 9/2011 | Pavon | 89/36.17 |
| 2002/0145308 A1 * | 10/2002 | Honlinger | 296/193 |
| 2005/0257679 A1 * | 11/2005 | Hass et al. | 89/36.09 |
| 2006/0196539 A1 | 9/2006 | Raska et al. | |
| 2007/0186762 A1 * | 8/2007 | Dehart et al. | 89/36.09 |
| 2007/0234896 A1 * | 10/2007 | Joynt | 89/36.09 |

(Continued)

*Primary Examiner* — Benjamin P Lee
(74) *Attorney, Agent, or Firm* — Patterson & Sheridan, L.L.P.

(57) ABSTRACT

A shock absorber system for use with a vehicle having a shield to reduce the effects of a shock event.

12 Claims, 2 Drawing Sheets

(56) References Cited

U.S. PATENT DOCUMENTS

| | | | |
|---|---|---|---|
| 2008/0034953 A1* | 2/2008 | Barbe et al. | 89/36.01 |
| 2008/0173167 A1* | 7/2008 | Mills et al. | 89/36.02 |
| 2009/0293712 A1* | 12/2009 | Ran et al. | 89/36.08 |
| 2010/0218667 A1* | 9/2010 | Naroditsky et al. | 89/36.02 |
| 2010/0251883 A1* | 10/2010 | Naroditsky | 89/36.02 |
| 2010/0307327 A1* | 12/2010 | Gettle | 89/36.02 |
| 2011/0017054 A1* | 1/2011 | Naroditsky et al. | 89/36.02 |
| 2011/0079134 A1* | 4/2011 | JacQuemont et al. | 89/36.02 |
| 2011/0138994 A1* | 6/2011 | Joynt et al. | 89/36.08 |
| 2011/0168001 A1* | 7/2011 | Lee | 89/36.02 |
| 2011/0197744 A1* | 8/2011 | Cox | 89/36.02 |

* cited by examiner

METHODS AND APPARATUS FOR SUSPENDING A VEHICLE SHIELD

CROSS-REFERENCE TO RELATED APPLICATIONS

This application claims benefit of U.S. provisional patent application Ser. No. 61/184,644, filed Jun. 5, 2009, which is herein incorporated by reference.

BACKGROUND OF THE INVENTION

1. Field of the Invention

Embodiments of the present invention generally relate to a shock absorber system for use with a vehicle having a shield to reduce the effects of a shock event.

2. Description of the Related Art

Integrated damper/spring vehicle shock absorbers often include a damper body surrounded by a mechanical spring. The damper often consists of a piston and shaft telescopically mounted in a fluid filled cylinder. The mechanical spring may be a helically wound spring that surrounds the damper body. Various integrated shock absorber configurations are described in U.S. Pat. Nos. 5,044,614, 5,803,443, 5,553,836 and 7,293,764, each of which is herein incorporated in its entirety by reference.

Some shock absorbers utilize gas as a spring medium in place of, or In addition to, mechanical springs. Gas spring type shock absorbers, having integral dampers, are described in U.S. Pat. Nos. 6,135,434, 6,360,857 and 6,311,962, each of which is herein incorporated in its entirety by reference.

Many land vehicles, particularly those used within a military context, must travel through areas that may contain explosive ordnance, such as land mines, or other energetic devices designed to penetrate or shock such vehicles. It is desirable to protect the passengers within the vehicle from penetrators (both ballistic and fragmentary) and shock loads associated with near vehicle explosions or vehicle impacts. It is also desirable to preserve as many primary operational functions of the vehicle as possible to facilitate continued travel. The underside of the vehicle is particularly vulnerable to non-discriminating devices such as land mines.

Rigidly mounted vehicle "blast" shielding has been attempted in various forms. U.S. Pat. No. 7,114,764, which is incorporated herein in its entirety by reference, shows elastomer coated aluminum plate disposed over an underside portion of a vehicle for blast protection. U.S. Pat. No. 4,404,889, which is incorporated herein in its entirety by reference, shows a multilayer composite structure for use as a vehicle shield (e.g. armor). U.S. Pat. No. 5,022,307, which is incorporated herein in its entirety by reference, shows a structure for shielding a portion of a vehicle undercarriage.

While some vehicle blast/shock attenuators (e.g. shields, armor) may be lighter than others, all add significant mass to the vehicle. The mechanism of blast attenuation is one of energy dissipation. Traditional blast shields relied on material density and its associated inertia to "absorb" blast energy. To reduce weight, more modern shields also rely on shock wave dissipation resulting from the crossing of material interfaces between materials having different sounds speeds. In either case, blast shields still comprise significant mass and may benefit from further lightening. What is needed is a shock absorber system that, in conjunction with a shield, can reduce the effects of a blast on the operation of vehicle and on the occupants of the vehicle. There is a further need for a shock absorber system that helps keep a vehicle operational even after a serious blast/shock has been received.

SUMMARY OF THE INVENTION

A shock absorber system for a vehicle includes features that attenuate blast effects and help to preserve some aspects of the vehicle and/or its occupants.

BRIEF DESCRIPTION OF THE DRAWINGS

So that the manner in which the above recited features can be understood in detail, a more particular description may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
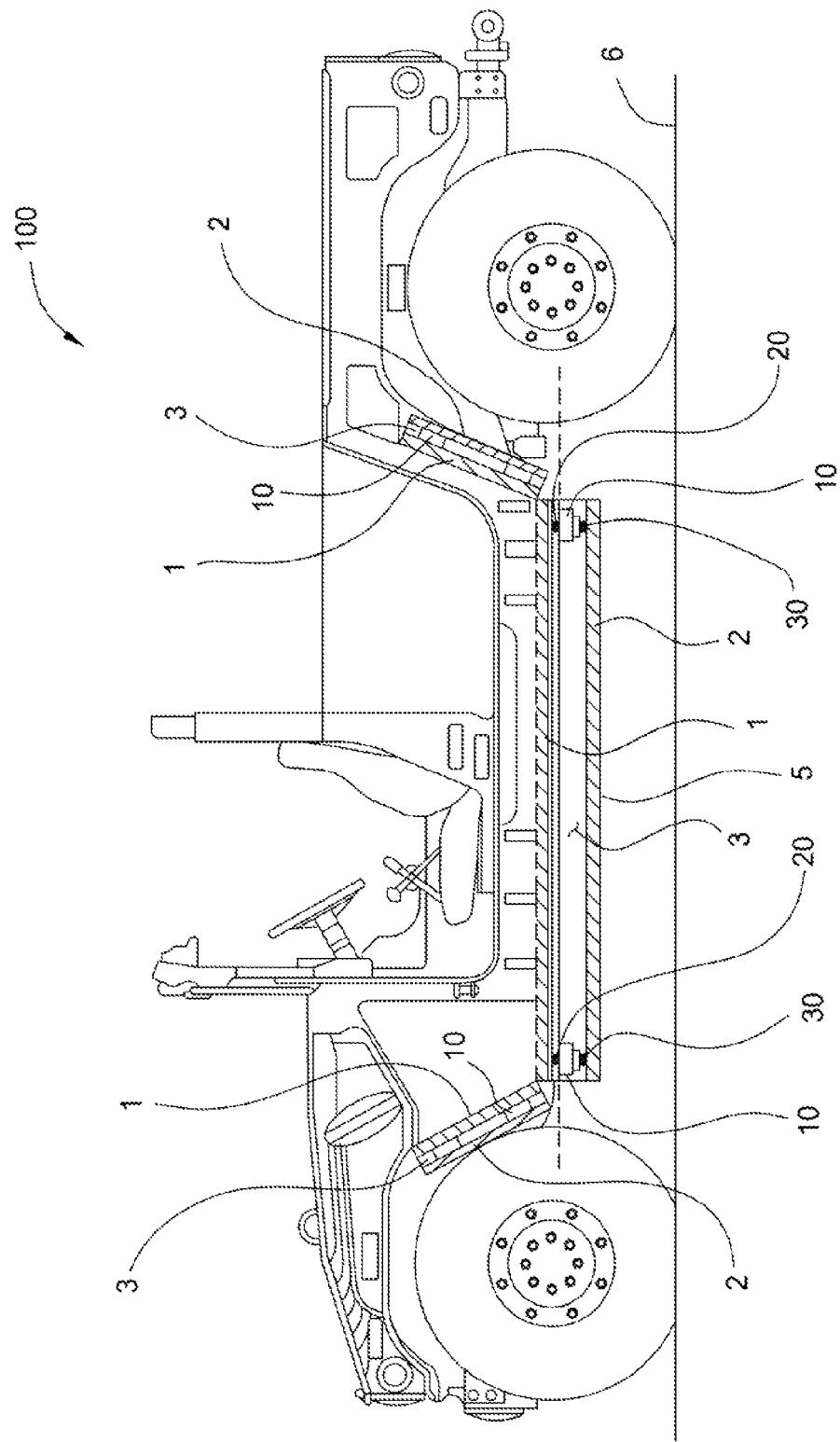
FIG. 1 is a side view of a vehicle having a plurality of shields attached thereto.

FIG. 1 shows an embodiment of the invention including three shields 2 mechanically suspended at various locations on a vehicle 100. In each case, the shield 2, which includes a shock receiving surface 3, is separated from the vehicle 100 by an air gap 3. In the embodiment shown, each shield is flanked by a shield base 1 to further define the air gap 3 and facilitate the attachment and operation of the shield 2. FIG. 1 shows shields disposed in an area under the passenger compartment and also in the areas of the wheels wells but the shields and shock absorbers disclosed herein can be installed anywhere in relation to a vehicle including engine/drive train areas, fuel tanks and anywhere else that might be subjected to a shock event.

Shock absorbers 10 are disposed in each air gap 3 between the shield 2 and shield base 1. In the embodiment of FIG. 1, the shock absorbers structurally maintain the primary shield 2 relative to shield base 1. For example, the shock absorbers 10 are located proximate corners of shield 2 or wherever may be needed to structurally maintain the shield 2 in place and keep it stable as the vehicle is operated. In one example, the shock absorbers are connected to shield 2 by a clevis bushing (eyelet) 30 (see also FIG. 2) and to the shield base 1 by a second clevis bushing 20. Optionally, either one or both of bushings 20 and 30 may be ball and socket type, bolt though post type, or any other suitable mounting structure so long as the connections are robust and remain functional in the event of a shock to the shock receiving surface 5 of the shield 2.

The shock absorber 10 may be any suitable shock absorber or combination of different shock absorbers as disclosed herein or otherwise. The shock 10 may comprise a structure such as that shown in U.S. Pat. No. 3,972,551, which is incorporated herein in its entirety by reference. The shock 10 may comprise a bump stop as shown in U.S. Pat. No. 7,140,601. In most cases, the shock absorber 10 is designed and built to permit rapid, rather than slowed operation due to the nature of the shocks generated by explosives forces. One example of a shock absorber 10 is shown in FIG. 2 and comprises a fluid/gas filled (e.g. emulsion) telescopic capsule 200 which is designed to compress and, in some cases, selectively burst upon application of a predetermined impulse load (either burst outright or pressure relieved by means of, for example, a rupturable member).

Figure 2:
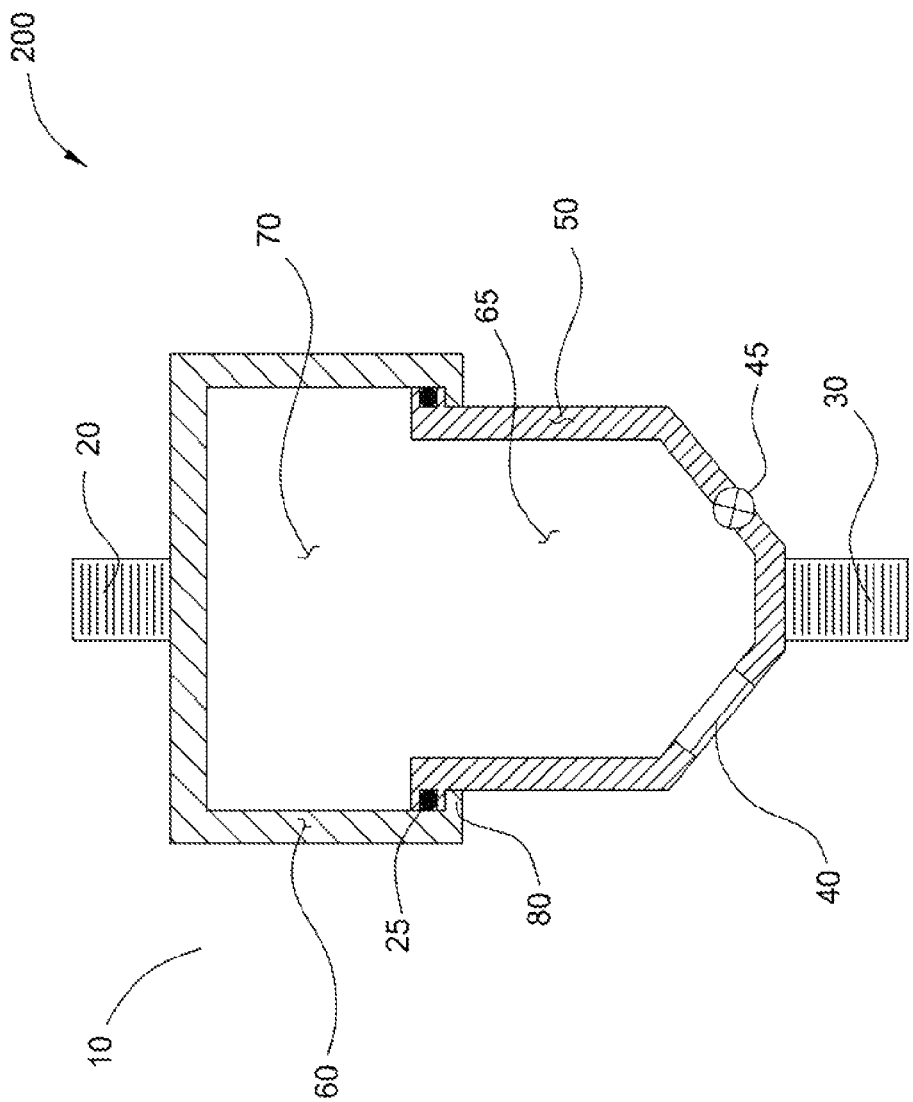
FIG. 2 is a section view of one embodiment of shock absorbers of FIG. 1.

In the embodiment of FIG. 2, the capsule 200 comprises a top cap 60 sealed by an O-ring 25 and telescopically engaged with a bottom cup 50. The top cap includes a post bolt 20, and the bottom cup includes a post bolt 30 for connection to the vehicle 100 (via the shield base 1) and shield 2, respectively. Any suitable connector and bushing arrangement may be used. The capsule 200 forms a volume 65 which is filled with a fluid 70 which may be either a liquid or a gas but may in one embodiment, comprise two different phase fluids like a gas and a liquid (e.g. an emulsion). In such embodiment the compressible gas phase acts as the spring (energy storage) mechanism for the shock and the liquid phase acts as the damping (energy dissipation) medium. A fill valve 45, such as for example a Schrader or Presta type, permits a user to adjust the pressure of the gas in volume 65. Optionally a separate fill port and pipe plug (not shown) may be used to introduce the liquid phase into the assembly. The cup 50 and the cap 60 are inter-engaged by a shoulder arrangement 80 between the two pieces to prevent axial separation of the cup 50 from the cap 60 (the shoulder being such that it causes interference between the two upon axial extension of the shock 10). Alternatively, or in addition to the shoulder arrangement, a simple limit strap (not shown) can be installed in the interior of capsule 200 to extend from an upper end of the cap 60 to a lower end of the cup 50 whereby when the shock is fully extended, the strap is tightened and the two components 50, 60 are prevented from becoming un-mated.

To further enhance high energy rate shock absorption, the shock 10 may include one or more high flow rate pressure relief devices, such as for example a rupture disk, to relieve overpressure within the shock caused by a high energy rate (and hence high compressive rate) event. When used with the shock absorbers discussed herein, pressure relief devices are especially important because their operation prevents the shock absorber housing from being destroyed during overpressure. Because of the substantially incompressible nature of most damping fluid (liquids) a metered damping fluid device may be unable to adequately respond to a very high rate compressive event (high rate extension events usually result in cavitation while unrelieved compression can cause structural damage).without sustaining damage. In one embodiment the blast shield shock is equipped with a calibrated rupture disk that will burst at a damping fluid pressure determined to be lower than a shock damage pressure thereby permitting the shock to continue to support the shield in its location relative to the vehicle.

In FIG. 2, a rupture disk 40 is installed in a wall of the cup 50 where, upon failure, it will permit instantaneous communication between volume 65 and air pressure outside the shock. In one embodiment, shock 10 contains a mixture of gas and liquid and as such exhibits initial compliance due to gas compression and progressive stiffness as the gas is compressed and the incompressible liquid phase begins to predominate in controlling the telescopic movement of the cup 50 into the cap 60. The gas/liquid interaction also provides some shock dampening (energy dissipation) under normal vehicle driving situations. When, however, a high energy rate event occurs (such as a nearby detonation), the assembly 200 becomes apparently incompressible and the internal fluid 70 pressure rises rapidly. Rupture disks 40 (or other suitable pressure relief devices) is located in the wall of the shock whereby at a calibrated internal pressure, the rupture disk will burst, thereby relieving internal pressure.

One example of a rupture disk is shown in U.S. Pat. No. 6,192,914, which is incorporated herein in its entirety by reference. Other examples of rapid acting pressure relief devices, including rupture disks and rupture pin valves, are shown in U.S. patent application publication no. 2006/0196539A1 (Ser. No. 10/547,616), which is incorporated herein in its entirety by reference.

In another embodiment, the shock absorbers include a piston (not shown) for metering fluid in a more controllable manner. In that instance, the rupture disk or disks can be located in the piston of a shock damper such that upon rupture of the disk (due to high loading rate of the shock), fluid may more freely flow from the compression side of the piston to the rebound side. Referring to the damper of U.S. Pat. No. 6,135,434, for example, the rupture disk may be located in a port (not shown) through piston 32. In one embodiment, the rupture disk or disks are used in the wall of a damper compression chamber and/or piston of a damper of a shock or fork associated with the wheel of a vehicle so that in the event that the wheel encounters a high energy rate event (such as a detonating land mine), the damper may relieve internal overpressure without sustaining damage (to the shock or the vehicle generally) that would render the vehicle disabled or injure occupants. Referring to the damper of U.S. Pat. No. 6,135,434 for example, the rupture disk may be located in a port or aperture (not shown) through damping cylinder 14. In one embodiment, the rupture disk is located in the wall and/or piston of a vehicle wheel damper (or fork) as a safety device to protect the occupants in the case of over-shock to the vehicle. As an example: a bicycle or motorcycle may be equipped with rupture disk relievable dampers to protect the rider (e.g. grip on the handlebars) in the event that an exceptionally large drop off or jump is traversed (prevent rider from impacting face on handlebars).

When a blast or detonation event occurs under or near a vehicle, the initial blast energy is dissipated by the shield material. That dissipation impulse is then transferred to the shield structure as a substantial unit, which absent anything else, is imparted to the vehicle as shock. In addition to absorbing some initial blast energy, the suspended shield as disclosed herein is useful in absorbing any secondary impulse and thereby further shielding the vehicle systems and occupants.

The shields 2 may comprise any suitable shielding material including solid metal, composite structures, and fibers, like Kevlar. As shown in FIG. 1, suspended shields may be placed as needed, including underneath the vehicle and in wheel wells or in any other suitable location (e.g. gas tank). In each case, the assembly preferably includes a base shield, air gap having a shock absorber installed therein and a shield having a shock receiving surface. While the shields shown in examples are constructed in planar manner and the primary shield 2 is parallel to the roadway 6 therebelow, it will be understood that the shield 2 could be any number of shapes so long as they permit shock absorbers to mounted to a first side and have a shock receiving surface substantially facing an origination point of a detonation or other shock producing event.

While the embodiments described have included a gap of air, it will further be understood that the air gap 3 could be filled with material that adds shock absorption to the assembly while still permitting the operation of the shock absorbers in the event of a shock event. In one example, part or all of the air gap could be filed with a honeycomb material designed to be crushed as the primary shield 2, for example moves upwards towards the base shield 1 (FIG. 1). In another example, a shock absorbing material is formed into a light weight and hollow shape by blow-molding thermoplastic plastic. A first wall and a second wall are spaced from and opposed to each other and connected by a shock absorbing material running between them. Such a shock absorbing material is disclosed in U.S. Pat. No. 7,618,082 and that patent is incorporated by reference herein in its entirety.

In yet another variation, the air gap is filled with an air bladder that is designed to compress and to ultimately fail (e.g. burst) as the shield 2 and shield base 1 move towards each other. Each of these arrangements is workable with the shock absorbers 10 described herein and shown in FIGS. 1 and 2.

While various aspects of the invention have been described in relation to a shield, it will be understood that some aspects are equally usable with conventional shock absorbers. For example, the shock events anticipated could easily destroy the suspension shock absorbers associated with each wheel of a vehicle, possibly rendering the vehicle un-drivable. However, placement of a pressure relief device, like a rupture disk in the compression chamber or piston of each shock absorber can help keep the shocks intact and the vehicle movable, even if they lose their shock-absorbing function. In many applications maintenance of vehicle mobility is critical even after a high rate blast event is encountered. For this reason aspects of the embodiments are equally pertinent to suspension shock absorbers.

While the foregoing is directed to embodiments of the present invention, other and further embodiments of the invention may be implemented without departing from the scope of the invention, and the scope thereof is determined by the claims that follow.

The invention claimed is:

1. A shock absorber system for a vehicle comprising:
   a shield having a first surface adjacent the vehicle and a shock receiving surface;
   an air gap between the shield and the vehicle; and
   a least one shock absorber disposed in the air gap, the shock absorber constructed and arranged to operate when the shock receiving surface of the shield is subjected to a shock event, the shock absorber including a pressure-operated, frangible pressure relief device,
   wherein the shock absorber includes a top cap mechanically attached to the vehicle and a bottom cup mechanically attached to the first surface of the shield,
   the cap and cup telescopically arranged relative to each other and operable upon the occurrence of the shock event,
   wherein the cap and cup include a volume formed therein, the volume reduced upon movement of the cap and cup relative to each other,
   wherein the frangible pressure relief device is in fluid communication with the volume; and
   further including a pressure relief device associated with each standard shock absorber provided for each wheel of the vehicle.

2. The system of claim 1, wherein the volume is filled with a gas.

3. The system of claim 2, wherein a pressure of the gas in the volume is user-adjustable via a valve.

4. The system of claim 1, wherein the volume is filled with a gas and a liquid.

5. The system of claim 1, wherein the volume includes a piston for metering the fluid therein and the relief device is disposed in the piston.

6. The system of claim 1, wherein the frangible pressure relief device includes a rupture disk constructed and arranged to fail at a predetermined pressure, thereby permitting pressure within the volume to be relieved.

7. The system of claim 6, wherein the shield is adjacent at least one wheel well of the vehicle.

8. The system of claim 7, wherein the shock absorbing material is a foam material.

9. The system of claim 1, wherein the air gap includes a shock absorbing material.

10. The system of claim 1, wherein the pressure-operated relief device is operated by an over-pressure.

11. The system of claim 10, wherein the relief device relieves pressure to an atmospheric volume.

12. A shock absorber system for a vehicle comprising:
    a shield having a first surface adjacent the vehicle and a shock receiving surface;
    an air gap between the shield and the vehicle;
    a least one shock absorber disposed in the air gap, the shock absorber constructed and arranged to operate when the shock receiving surface of the shield is subjected to a shock event, the shock absorber including a frangible pressure relief device;
    wherein the shock absorber includes a top cap mechanically attached to the vehicle and a bottom cup mechanically attached to the first surface of the shield, the cap and cup telescopically arranged relative to each other and operable upon the occurrence of the shock event and wherein the cap and cup include a volume formed therein, the volume reduced upon movement of the cap and cup relative to each other; and wherein the frangible pressure relief device is in fluid communication with the volume; and further including a pressure relief device associated with each standard shock absorber provided for each wheel of the vehicle.

\* \* \* \* \*